United States Patent
Bultje et al.

(10) Patent No.: US 8,396,127 B1
(45) Date of Patent: Mar. 12, 2013

(54) SEGMENTATION FOR VIDEO CODING USING PREDICTIVE BENEFIT

(75) Inventors: Ronald Sebastiaan Bultje, San Jose, CA (US); Paul Gordon Wilkins, Cambridge (GB); Pascal Massimino, Orsay (FR)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/534,252

(22) Filed: Jun. 27, 2012

(51) Int. Cl.
*H04N 7/12* (2006.01)

(52) U.S. Cl. .............................. 375/240.13; 375/240.27

(58) Field of Classification Search ............. 375/240.03, 375/240.13, 240.27
See application file for complete search history.

(56) References Cited

U.S. PATENT DOCUMENTS

| | | | | |
|---|---|---|---|---|
| 2002/0181790 A1* | 12/2002 | Nakata | ........................... | 382/236 |
| 2006/0251330 A1* | 11/2006 | Toth et al. | ...................... | 382/236 |
| 2006/0285589 A1* | 12/2006 | Hannuksela | ............. | 375/240.12 |
| 2007/0217508 A1* | 9/2007 | Shimada et al. | ......... | 375/240.03 |
| 2011/0007977 A1* | 1/2011 | Amonou et al. | .............. | 382/233 |
| 2012/0106637 A1* | 5/2012 | Lee et al. | .................. | 375/240.13 |
| 2012/0114035 A1* | 5/2012 | Nakagomi et al. | ....... | 375/240.03 |
| 2012/0114039 A1* | 5/2012 | Wang | ....................... | 375/240.13 |
| 2012/0257677 A1* | 10/2012 | Bankoski et al. | ......... | 375/240.16 |

OTHER PUBLICATIONS

Glaser-Garrett, Jason, "A novel macroblock-tree algorithm for high-performance optimization of dependent video coding in H.264/AVC", Department of Computer Science, Harvey Mudd College, Date Unknown, 12 pp.

\* cited by examiner

*Primary Examiner* — Sath V Perungavoor
*Assistant Examiner* — James Pontius
(74) *Attorney, Agent, or Firm* — Young Basile Hanlon & MacFarlane P.C.

(57) ABSTRACT

A frame of a video stream is segmented based on its ability to predict the contents of one or more temporally nearby frames. Predictive ability can be measured by comparing the magnitude of the error per block of a video for intra-frame prediction with inter-frame prediction. Segments can be determined by grouping similar error magnitudes together when the frame is a good predictor for the nearby frames. Coding parameters can be defined at the segment level to reduce the number of bits used to represent the encoded video stream and thereby reduce network and/or storage bandwidth.

20 Claims, 7 Drawing Sheets

SEGMENTATION FOR VIDEO CODING USING PREDICTIVE BENEFIT

TECHNICAL FIELD

This disclosure relates to encoding and decoding visual data, such as video stream data, for transmission or storage using segmentation.

BACKGROUND

Digital video streams typically represent video using a sequence of frames or still images. Each frame can include a number of blocks, which in turn may contain information describing the value of color, brightness or other attributes for pixels. The amount of data in a typical video stream is large, and transmission and storage of video can use significant computing or communications resources. Various approaches have been proposed to reduce the amount of data in video streams, including compression and other encoding techniques. The compression techniques can be lossy or lossless.

SUMMARY

Disclosed herein are aspects of systems, methods and apparatuses for encoding and decoding a video signal. One method for encoding a video stream having a plurality of frames includes receiving a first frame of the plurality of frames, receiving a second frame of the plurality of frames, determining a first error for a plurality of blocks of the second frame based on intra-frame prediction, determining a second error for the plurality of blocks of the second frame based on inter-frame prediction using at least one block of the first frame, determining a predictive benefit for one or more blocks of the first frame by comparing the first error and the second error of one or more blocks of the second frame corresponding to the one or more blocks of the first frame, segmenting the first frame to form a first segment based on the predictive benefit, selecting at least a first coding parameter for the first segment of the first frame, and encoding blocks of the first segment of the first frame into a bitstream using at least the first coding parameter.

Another aspect of the disclosed implementations is a method for decoding an encoded video stream having a plurality of frames. An aspect of this method includes receiving a first frame of the plurality of frames and receiving a first segment identifying a plurality of blocks of the first frame, the first segment formed by determining a first error for a plurality of blocks of at least a second frame based on intra-frame prediction, determining a second error for the plurality of blocks of at least the second frame based on inter-frame prediction using at least one block of the first frame, determining a predictive benefit for one or more blocks of the first frame by comparing the first error and the second error of one or more blocks of the at least the second frame corresponding to the one or more blocks of the first frame, and segmenting the first frame based on the predictive benefit. The method also includes receiving at least a first coding parameter associated with the first segment, decoding the plurality of blocks of the first segment using at least the first decoding parameter, receiving the second frame of the plurality of frames, determining a segment of the second frame including a plurality of blocks corresponding to the plurality of blocks of the first segment using a processor, and decoding blocks of the segment of the second frame using the at least the first coding parameter and corresponding blocks of the first segment of the first frame.

Another aspect of the disclosed implementations is an apparatus for encoding a videos stream having a plurality of frames having a plurality of blocks. The apparatus comprises a memory and a processor. The processor is configured to execute instructions stored in the memory to receive a first frame of the plurality of frames, receive a second frame of the plurality of frames, determine a first error for a plurality of blocks of the second frame based on intra-frame prediction, determine a second error for the plurality of blocks of the second frame based on inter-frame prediction using at least one block of the first frame, determine a predictive benefit for one or more blocks of the first frame by comparing the first error and the second error of one or more blocks of the second frame corresponding to the one or more blocks of the first frame, segment the first frame to form a first segment based on the predictive benefit, select at least a first coding parameter for the first segment of the first frame, and encode blocks of the first segment of the first frame into a bitstream using at least the first coding parameter.

Variations in these and other aspects will be described in additional detail hereafter.

BRIEF DESCRIPTION OF THE DRAWINGS

The description herein makes reference to the accompanying drawings wherein like reference numerals refer to like parts throughout the several views, and wherein.

DETAILED DESCRIPTION

Digital video is used for various purposes including, for example, remote business meetings via video conferencing, high definition video entertainment, video advertisements, and sharing of user-generated videos. As technology is evolving, users have higher expectations for video quality and expect high resolution video even when transmitted over communications channels having limited bandwidth.

To limit the amount of data transmitted, video streams can be compressed using multiple formats. Lossy video compression attempts to find the most optimal way to preserve signals from a source video at as low a bitrate as possible, and the trade-offs that video encoders make to lead to optimal results depend on characteristics of the source video (motion, complexity, etc.).

For example, a relatively static scene may benefit from a high percentage of its datarate being spent on the first frame, such as to get as much detail as possible right straight away. Since the remainder of the scene is almost identical to the first frame, only a small percentage of the datarate could be spent on that. Further, many of the following frames may use motion vectors, references and such that can be easily predicted from a single coding point in the bitstream. In contrast, complex scenes with lots of motion can benefit from a more equal distribution of bits and sometimes have a more ambiguous prediction model of motion vectors, motion reference frames, etc.

Individual frames or scenes often contain multiple objects with such different characteristics, thus making this problem more complex at the sub-frame level. Teachings herein predict frame segmentations or compression modes at a sub-frame level in an attempt to reach a desirable level of compression for such frames. First discussed below are environments in which aspects of this disclosure can be implemented.

Figure 1:
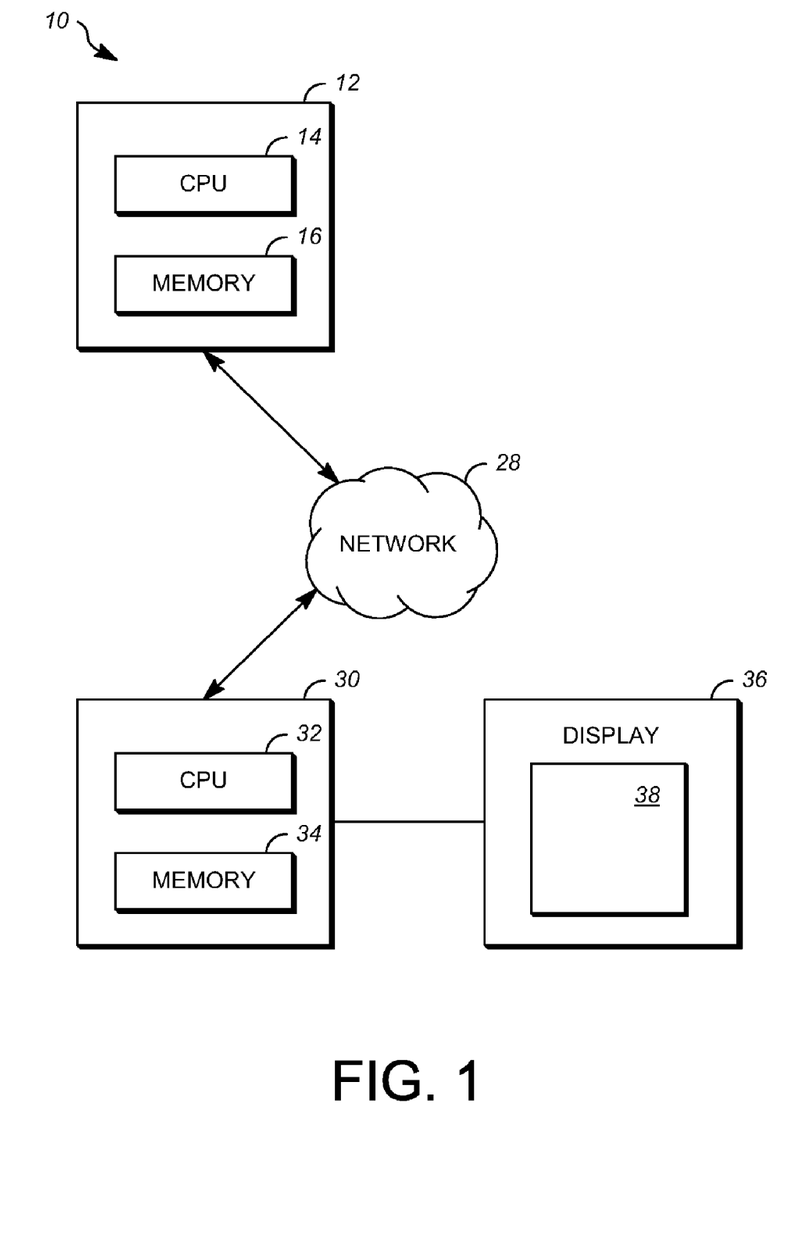
FIG. 1 is a schematic of a video encoding and decoding system.

FIG. 1 is a schematic of a video encoding and decoding system 10. An exemplary transmitting station 12 can be, for example, a computer having an internal configuration of hardware including a processor such as a central processing unit (CPU) 14 and a memory 16. CPU 14 can be a controller for controlling the operations of transmitting station 12. CPU 14 is connected to memory 16 by, for example, a memory bus. Memory 16 can be read only memory (ROM), random access memory (RAM) or any other suitable memory device. Memory 16 can store data and program instructions that are used by CPU 14. Other suitable implementations of transmitting station 12 are possible. For example, the processing of transmitting station 12 can be distributed among multiple devices.

A network 28 connects transmitting station 12 and a receiving station 30 for encoding and decoding of the video stream. Specifically, the video stream can be encoded in transmitting station 12 and the encoded video stream can be decoded in receiving station 30. Network 28 can, for example, be the Internet. Network 28 can also be a local area network (LAN), wide area network (WAN), virtual private network (VPN), or any other means of transferring the video stream from transmitting station 12 to, in this example, receiving station 30.

Receiving station 30, in one example, can be a computer having an internal configuration of hardware including a processor such as a CPU 32 and a memory 34. CPU 32 can be a controller for controlling the operations of receiving station 30. CPU 32 is connected to memory 34 by, for example, a memory bus. Memory 34 can be ROM, RAM or any other suitable memory device. Memory 34 can store data and program instructions that are used by CPU 32. Other suitable implementations of receiving station 30 are possible. For example, the processing of receiving station 30 can be distributed among multiple devices.

A display 36 configured to display a video stream can be connected to receiving station 30. Display 36 can be implemented in various ways, including by a liquid crystal display (LCD), a cathode-ray tube (CRT) or a light emitting diode display (LED), such as an OLED display. Display 36 is coupled to CPU 32 and can be configured to display a rendering 38 of the video stream decoded in receiving station 30.

Other implementations of encoder and decoder system 10 are possible. In some of the implementations described, for example, an encoder is in transmitting station 12 and a decoder is in receiving station 30 as instructions in memory or a component separate from memory. However, an encoder or decoder can be coupled to a respective station 12, 30 rather than in it. Further, one implementation can omit network 28 and/or display 36. In another implementation, a video stream can be encoded and then stored for transmission at a later time to receiving station 30 or any other device having memory. In one implementation, a video stream is received by receiving station 30 (e.g., via network 28, a computer bus and/or some communication pathway) and stored for later decoding. In another implementation, additional components can be added to encoder and decoder system 10. For example, a display or a video camera can be attached to transmitting station 12 to capture the video stream to be encoded. In an exemplary implementation, a real-time transport protocol (RTP) is used for transmission of the encoded video. In another implementation, a transport protocol other than RTP may be used, e.g., an HTTP-based video streaming protocol.

Figure 2:
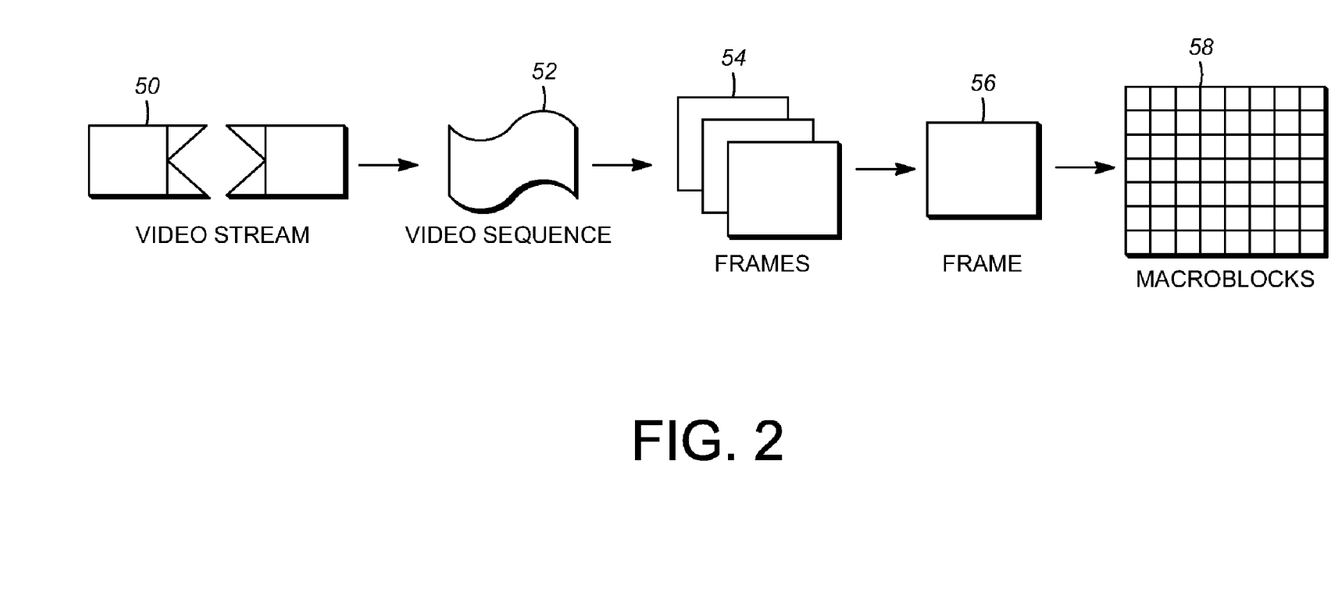
FIG. 2 is a diagram of a typical video stream to be encoded and decoded.

FIG. 2 is a diagram of a typical video stream 50 to be encoded and decoded. Video stream 50 includes a video sequence 52. At the next level, video sequence 52 includes a number of adjacent frames 54. While three frames are depicted as adjacent frames 54, video sequence 52 can include any number of adjacent frames. Adjacent frames 54 can then be further subdivided into individual frames, e.g., a single frame 56. At the next level, single frame 56 can be divided into a series of blocks 58, which can contain data corresponding to, for example, 16×16 pixels in frame 56. Each block can contain luminance and chrominance data for the corresponding pixels. Blocks 58 can also be of any other suitable size such as 16×8 pixel groups or 8×16 pixel groups and can be further subdivided into smaller blocks depending on the application. Unless otherwise noted, the terms block and macroblock are used interchangeably herein.

Figure 3:
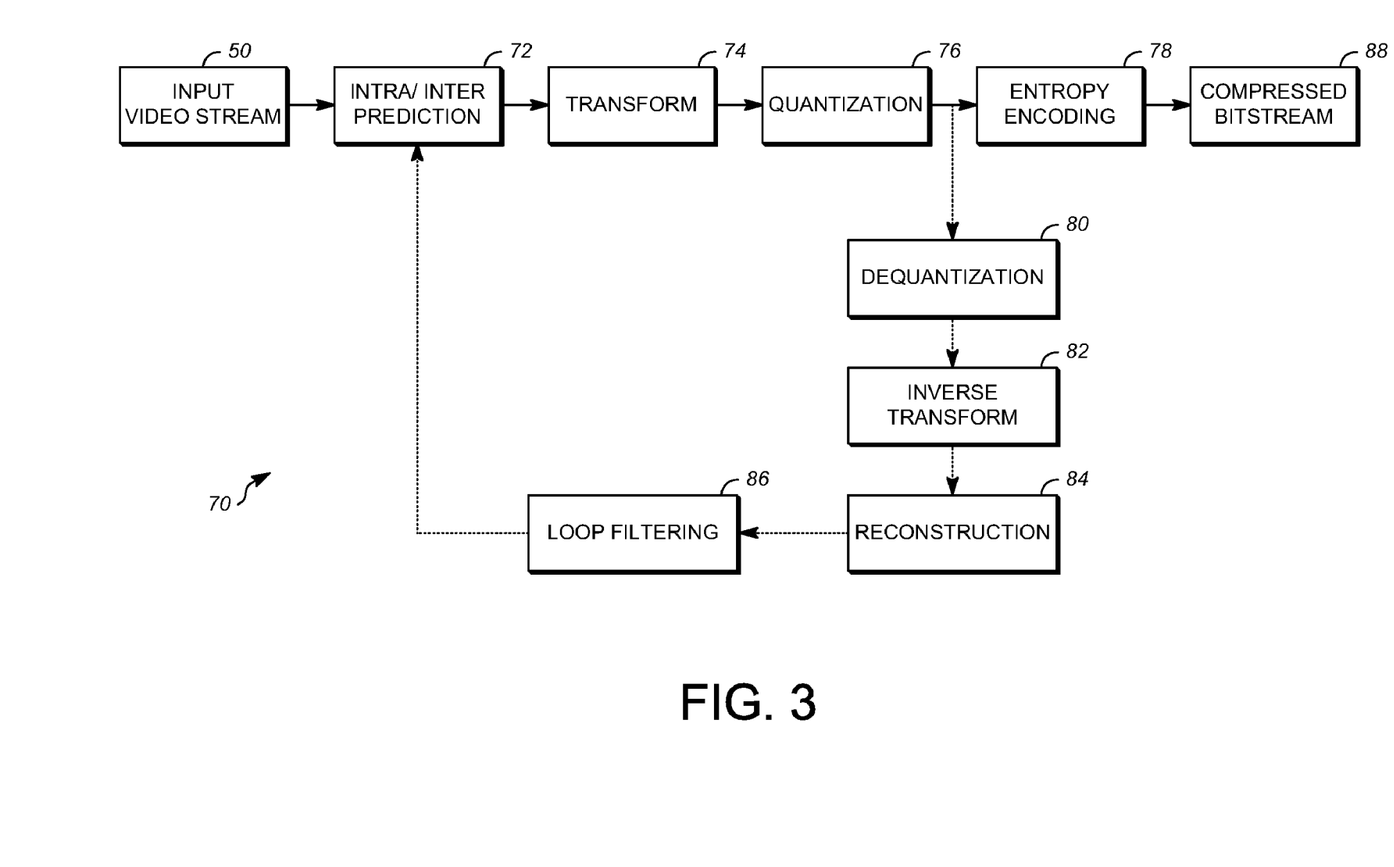
FIG. 3 is a block diagram of a video compression system in accordance with an implementation.

FIG. 3 is a block diagram of an encoder 70 in accordance with an implementation. Encoder 70 can be implemented, as described above, in transmitting station 12 such as by providing a computer software program stored in memory 16, for example. The computer software program can include machine instructions that, when executed by CPU 14, cause transmitting station 12 to encode video data in the manner described in FIG. 3. Encoder 70 can also be implemented as specialized hardware included, for example, in transmitting station 12. Encoder 70 has the following stages to perform the various functions in a forward path (shown by the solid connection lines) to produce an encoded or a compressed bitstream 88 using input video stream 50: an intra/inter prediction stage 72, a transform stage 74, a quantization stage 76, and an entropy encoding stage 78. Encoder 70 may also include a reconstruction path (shown by the dotted connection lines) to reconstruct a frame for encoding of future blocks. In FIG. 3, encoder 70 has the following stages to perform the various functions in the reconstruction path: a dequantization stage 80, an inverse transform stage 82, a reconstruction stage 84, and a loop filtering stage 86. Other structural variations of encoder 70 can be used to encode video stream 50.

When video stream 50 is presented for encoding, each frame 56 within video stream 50 is processed in units of blocks. At intra/inter prediction stage 72, each block can be encoded using either intra-frame prediction (within a single frame) or inter-frame prediction (from frame to frame). In either case, a prediction block can be formed. In the case of intra-prediction, a prediction block can be formed from samples in the current frame that have been previously encoded and reconstructed. In the case of inter-prediction, a prediction block can be formed from samples in one or more previously constructed reference frames.

Next, still referring to FIG. 3, the prediction block can be subtracted from the current block at intra/inter prediction stage 72 to produce a residual block (residual). Transform stage 74 transforms the residual into transform coefficients in, for example, the frequency domain. Examples of block-based transforms include the Karhunen-Loève Transform (KLT), the Discrete Cosine Transform (DCT), and the Singular Value Decomposition Transform (SVD). In one example, the DCT transforms the block into the frequency domain. In the case of DCT, the transform coefficient values are based on spatial frequency, with the lowest frequency (DC) coefficient at the top-left of the matrix and the highest frequency coefficient at the bottom-right of the matrix.

Quantization stage 76 converts the transform coefficients into discrete quantum values, which are referred to as quantized transform coefficients, using a quantizer value or a quantization level. The quantized transform coefficients are then entropy encoded by entropy encoding stage 78. The entropy-encoded coefficients, together with other information used to decode the block, which may include for example the type of prediction used, motion vectors, and quantizer value, are then output to compressed bitstream 88. Compressed bitstream 88 can be formatted using various techniques, such as variable length encoding (VLC) and arithmetic coding. Compressed bitstream 88 can also be referred to as an encoded video stream and the terms will be used interchangeably herein.

The reconstruction path in FIG. 3 (shown by the dotted connection lines) can be used to ensure that both encoder 70 and a decoder 100 (described below) use the same reference frames to decode compressed bitstream 88. The reconstruction path performs functions that are similar to functions that take place during the decoding process that are discussed in more detail below, including dequantizing the quantized transform coefficients at dequantization stage 80 and inverse transforming the dequantized transform coefficients at inverse transform stage 82 to produce a derivative residual block (derivative residual). At reconstruction stage 84, the prediction block that was predicted at intra/inter prediction stage 72 can be added to the derivative residual to create a reconstructed block. Loop filtering stage 86 can be applied to the reconstructed block to reduce distortion such as blocking artifacts.

Other variations of encoder 70 can be used to encode compressed bitstream 88. For example, a non-transform based encoder 70 can quantize the residual signal directly without transform stage 74. In another implementation, an encoder 70 can have quantization stage 76 and dequantization stage 80 combined into a single stage.

Figure 4:
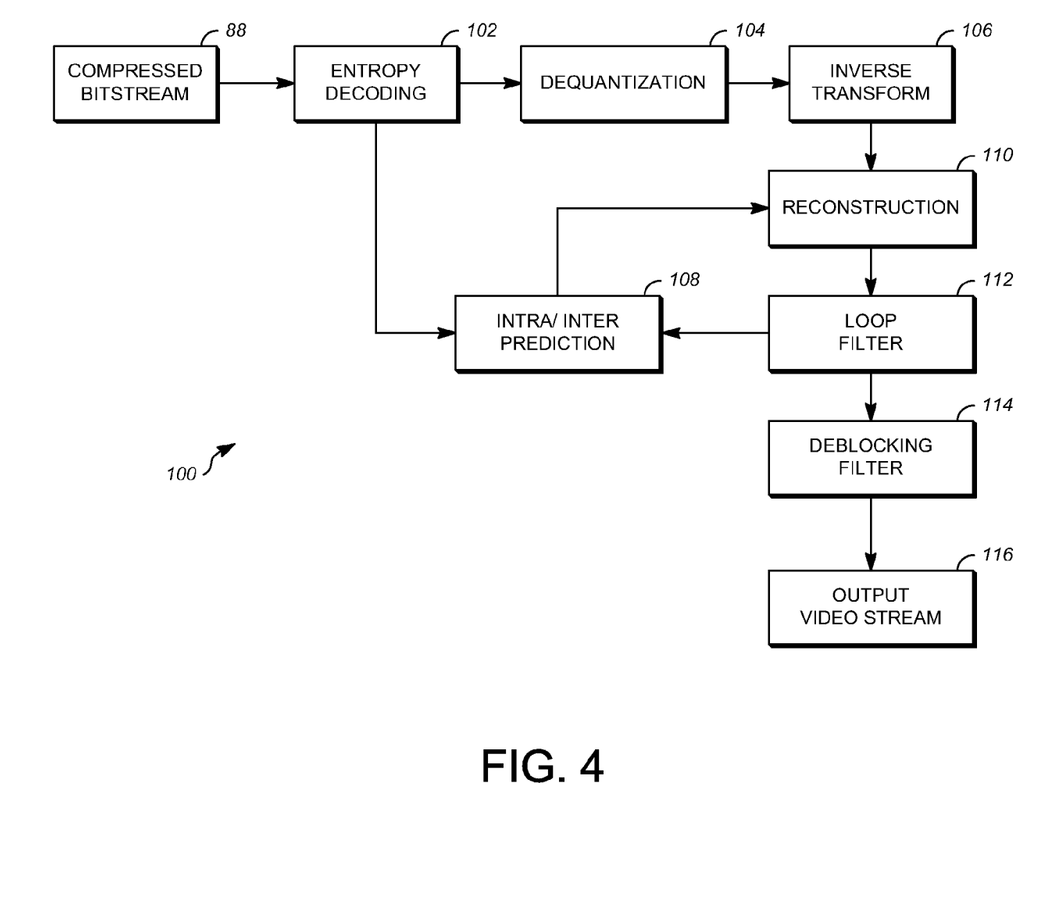
FIG. 4 is a block diagram of a video decompression system in accordance with another implementation.

FIG. 4 is a block diagram of a decoder 100 in accordance with another implementation. Decoder 100 can be implemented in receiving station 30, for example, by providing a computer software program stored in memory 34. The computer software program can include machine instructions that, when executed by CPU 32, cause receiving station 30 to decode video data in the manner described in FIG. 4. Decoder 100 can also be implemented as specialized hardware included, for example, in transmitting station 12 or receiving station 30.

Decoder 100, similar to the reconstruction path of encoder 70 discussed above, includes in one example the following stages to perform various functions to produce an output video stream 116 from compressed bitstream 88: an entropy decoding stage 102, a dequantization stage 104, an inverse transform stage 106, an intra/inter prediction stage 108, a reconstruction stage 110, a loop filtering stage 112 and a deblocking filtering stage 114. Other structural variations of decoder 100 can be used to decode compressed bitstream 88.

When compressed bitstream 88 is presented for decoding, the data elements within compressed bitstream 88 can be decoded by the entropy decoding stage 102 (using, for example, arithmetic coding) to produce a set of quantized transform coefficients. Dequantization stage 104 dequantizes the quantized transform coefficients, and inverse transform stage 106 inverse transforms the dequantized transform coefficients to produce a derivative residual that can be identical to that created by inverse transform stage 82 in encoder 70. Using header information decoded from compressed bitstream 88, decoder 100 can use intra/inter prediction stage 108 to create the same prediction block as was created in encoder 70, e.g. at intra/inter prediction stage 72. At reconstruction stage 110, the prediction block can be added to the derivative residual to create a reconstructed block. Loop filtering stage 112 can be applied to the reconstructed block to reduce blocking artifacts. Deblocking filtering stage 114 can be applied to the reconstructed block to reduce blocking distortion, and the result is output as output video stream 116. Output video stream 116 can also be referred to as a decoded video stream and the terms will be used interchangeably herein.

Other variations of decoder 100 can be used to decode compressed bitstream 88. For example, decoder 100 can produce output video stream 116 without deblocking filtering stage 114.

According to teachings herein, a predictiveness model can be used to divide a frame into segments. The segments can, in turn, be used to reach a desirable level of compression for frames, such as those including a combination of relatively static image portions and portions with more complex movement. The desirable level of compression can be controlled by encoder settings such as quantizer or loop filter strength as discussed in additional detail hereinafter. Note that a static image (e.g., a background) is not necessarily a still image—it can be a statically moving image (e.g., a statically moving background).

Figure 5:
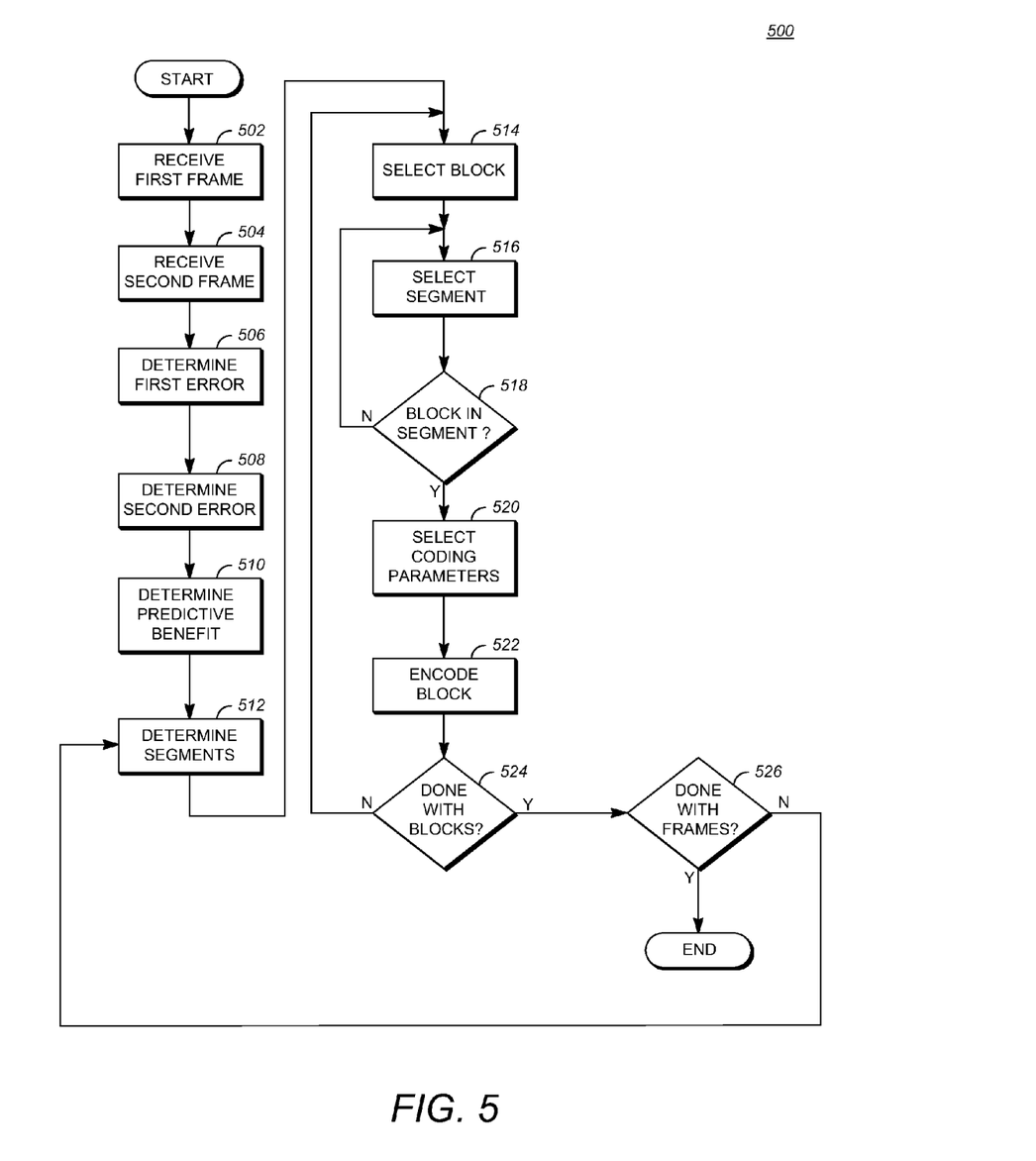
FIG. 5 is a flowchart of a process for encoding a video stream according to an implementation.

FIG. 5 is a flowchart of a process 500 for encoding a video stream according to an implementation. Process 500 can be implemented in an encoder such as encoder 70 to select values of encoding parameters used by encoder 70 to encode a video stream. Process 500 can be implemented, for example, as a software program that is executed by computing devices such as transmitting station 12 or receiving station 30. The software program can include machine-readable instructions that are stored in a memory such as memory 16 or memory 34 that, when executed by a processor such as CPU 14 or CPU 32, cause the computing device to perform process 500. Process 500 can also be implemented using specialized hardware. As explained above, some computing devices may have multiple memories and multiple processors, and the steps of process 500 may in such cases be distributed using different processors and memories. Use of the terms "processor" and "memory" in the singular encompasses computing devices that have only one processor or one memory as well as devices having multiple processors or memories that may each be used in the performance of some but not necessarily all of the recited steps.

For simplicity of explanation, process 500 is depicted and described as a series of steps. However, steps in accordance with this disclosure can occur in various orders and/or concurrently. For example, while in FIG. 5 first error weights appear to be determined at step 506 before second error weights are determined at 508, it shall be appreciated that error weights may be determined in other orders and remain within the scope of this disclosure. For example, second error weights may be determined before or concurrently with the determination of first error weights. Additionally, steps in accordance with this disclosure may occur with other steps not presented and described herein. Furthermore, not all illustrated steps may be required to implement a method in accordance with the disclosed subject matter.

At step 502, a frame of a video stream is received at an encoder, such as encoder 70. The video stream can be received in any number of ways, such as by receiving the video stream over a network, over a cable, or by reading the video data from a primary memory or other storage device, including a disk drive or removable media such as a CompactFlash (CF) card, Secure Digital (SD) card, or the like. This first received frame is also referred to as the current frame to be encoded. At step 504, a second frame of a video stream is also received. In this implementation, the second frame is a future frame, i.e., a frame temporally located within the video stream after the first received frame. In the example of FIG. 5, only the current frame and one subsequent frame are described. However, the calculations related to the second frame described in FIG. 5 can be performed for a number of frames, such as all frames subsequent to the current frame, as described in additional detail below.

At step 506, first errors are determined for the blocks of the second frame. As used herein, determined can mean calculated, estimated, identified, constructed, specified, selected, read from a network, or read from a storage device such as a primary memory or secondary storage including a disk drive or removable media such as a CF card, SD card or the like. A first error of a current block is a quantitative measure of the complexity of the block. In an example, this measure of complexity is the amount of new data that is introduced by the current block that was not already present in one or more previously-encoded neighboring blocks of the same frame. In a raster order scan, for example, this could be the blocks of the frame to the top and/or left of the current block. As mentioned above, intra-frame prediction (or intra prediction) predicts the contents of current block from the contents of one or more neighboring blocks. Data of the predicted block data is subtracted from that of the current block to form the residual. Thus, the first error can describe the weight of the difference between the intra-predicted signal and the source signal—in other words, the weight of the residual data of a block after intra prediction. The first error for a block can be calculated as the sum of the absolute values of the residual (sum of absolute differences or SAD), or the residual can be transformed to determine the first error as the sum of the absolute values of the transformed residual values (sum of absolute transformed differences or SATD). Other weightings, such as the mean square error of the residual values, can be used to determine the first error. Note that the residual values could be based on either chrominance or luminance values of pixels of the original block.

At step 508, second error can be determined for the blocks of the second frame. The second error can also be a quantitative measure of complexity for a current block. In this example, the second error is a measure of the amount of new data that is introduced by the current block that was not already present in a corresponding block of the current frame. Inter-frame prediction (or inter prediction) subtracts the data of a corresponding block from a reference frame, here the first frame, from the data of a current block in the second frame to form a residual. Thus, the second error can describe the weight of the difference between the inter-predicted signal and the source signal—in other words, the weight of the residual data of a block following inter prediction. To do this in step 508, the encoder (e.g., using intra/inter prediction stage 72) can perform a motion search to find the optimal motion vector for the current block of the second frame against the first frame. The optimal motion vector is the vector that results in a minimal residual when the corresponding (or prediction) block of the first frame is subtracted from the current block. Any number of techniques, such as a diamond search, can be used to perform the motion search, and motion vectors other than the optimal motion vector can be used in implementations of the teachings herein. Once the motion vector is found, and the residual calculated, the second error for the block of the second frame can be calculated as the SAD, SATD, or mean square error of the residual.

If the second error is lower than the first error for a block, there is a benefit to that block of using the first frame as a motion reference frame over using something else as a reference frame (e.g., the second frame). That is, the predictive strength of inter prediction using motion vectors from the first frame is greater than the predictive strength of intra prediction. At step 510, this predictive benefit, if any, is determined by subtracting the second error from the first error. In this implementation, if there is no predictive benefit (i.e., the second error is equal to or greater than the first error), the value for predictive benefit is zero. In other implementations, the predictive benefit can be a negative number obtained by subtracting the second error from the first error.

Steps 506 through 510 are performed using every block of the second frame. Moreover, steps 506 through 510 can be performed for every block of a set of frames temporally near the first frame. The set of frames can occur either before or after the first frame, or can overlap the first frame. In this way, the predictive benefit for every block of the current frame by summing the predictive benefit over the set of frames. For example, in a relatively static scene, all sections of the current frame have a high prediction level and thus have a relatively uniform predictive benefit for each block. In a scene with multiple objects, e.g., a moving person in a static background or a complex variation thereof, blocks of the static background will have a higher predictive benefit than the moving person or other moving objects.

Where the set of frame captures a moving background scene (e.g., a camera moves from left to right), the predictive benefit of a reference frame depends on the temporal position of the reference frame relative to the set of frames. Herein, these frames are referred to future frames because they are encoded after the first frame. Where the current frame temporally precedes the future frames, the left edge of the current frame would not have any predictive benefit to the future frames, because the data is no longer in the visible area of these future frames. However, if the current frame is taken as a point in the future ahead of the future frames, then the right edge of the current frame would have no predictive benefit. If there are objects moving in front of a mostly static background, then the predictive benefit of the visual information at the position of these objects in the current frame will be much lower than at the background Likewise, the motion vectors of the blocks of the background will be highly similar to each other within each frame of the set of future frames (for a static background, they will all be zero; for a moving background, they will all be the amount that the frame moved relative to the reference point), whereas motion vectors for blocks belonging to objects not part of the background can have different motion vectors, reference frames and prediction modes.

The predictive benefit of the blocks can be used to segment the current frame so as to reflect these various scenarios. More specifically, process 512 determines segments for the first frame using the predictive benefits of the blocks at step 512 so as to arrange the blocks into objects having different predictive benefit at step 512. An example of an algorithm that can group blocks according to the value of a property such as predictive benefit is the k-means algorithm that can group elements into k groups. Another example of an algorithm that can group blocks according to the value of a property of the blocks is the expectation-maximization algorithm. Other segmentation algorithms or techniques are possible using the predictive benefit.

Once the current frame is separated into objects with different predictive benefit, per-segment encoding settings can be defined to lead to better compression/quality trade-offs when encoding frames of an input video sequence starting at step 514. At step 514, process 500 begins encoding the first frame by selecting a block from the first frame. As used herein, the term select can mean to identify, specify, read from a network, or read from a storage device such as a primary memory or secondary storage including a disk drive or from removable media such as a CF card, SD card or the like. Blocks can be selected from the frame in raster scan order or another order compatible with encoder 70.

At step 516, a segment of the segments determined in step 512 can be selected, and at step 518, the address in the frame of the block selected at step 514 is compared to the addresses of the blocks included in the selected segment to determine if the selected block belongs to the selected segment. That is, each segment includes the block addresses, for example (i, j), in a set belonging to the segment. If the block does not belong to the segment, process 500 loops back to step 516 to select another segment and repeats step 518. This loop is continued until a segment is found to which the block belongs or the segments are exhausted.

At step 520, encoding parameters can be selected for encoding the selected block based on the segment to which it belongs. In cases in which the selected block does not belong to any segment, default encoding parameter values can be used, or encoding parameter values can be specified on a per-block basis.

The selection of encoding parameters in step 520 can be based on the predictive benefit of the blocks included in the segment or other measures applicable to the blocks. Encoding parameters that can be selected include, for example, whether the block is predicted using compounded or dual motion prediction (both intra and inter prediction) and what coding mode is selected (e.g., zero motion vector, near motion vector or new motion vector, different intra coding modes, intra vs. inter coding, etc.), along with encoder settings such as quantizer value or loop filter strength. These values can be coded at the segment level rather than at the block level, thereby decreasing the number of bits spent in the video stream on encoding the information later used to decode the blocks. For example, it is expected that each block that belongs to a static or background segment, including blocks of the segment in frames after the first frame will have approximately the same motion vector. As discussed above, a frame representing a scene being visually panned so as to move in unison will also have approximately the same motion vectors, with the exception of parts of the scene being introduced or lost at the borders. Therefore, the motion vector for the whole segment can be encoded once, rather than on a per-block basis. Segment-based motion vector prediction can lead to a decrease in the number of bits spent on motion vector coding, leaving more bits for other information in the bitstream.

At step 522, the selected block is encoded, for example by encoder 70, using the encoding parameters selected at step 520. The encoding parameters used can be included in the encoded video stream either at the block level or at the segment level as described above, yielding savings in the number of bits included in the video stream. In cases where the bandwidth is fixed, for example, this permits more bits to be used to encode the transformed coefficients representing the image data, thereby increasing video quality.

At step 524, process 500 checks to see if any more blocks remain to be encoded. If more blocks remain, process 500 loops back to step 514 to select the next block. If no more blocks in the current frame remain to be encoded, process 500 advances to step 526 to determine whether there are additional frames to be encoded. If not, process 500 ends.

If it is determined, in response to the query of step 526, that additional frames are to be encoded, the next frame (called a second frame hereinafter) is selected for processing starting at step 512. At step 512, segments can be determined by applying the segments of the first frame to the blocks of the second frame, where addresses of blocks in the second frame correspond to addresses of the blocks included in a segment.

Selecting one or more encoding parameters at step 520 for the second frame can be based on the segment and the encoding parameters selected at step 520 for the first frame. For example, if the segment of the first frame included background blocks with high predictive value, the encoding parameters selected for a current block of the second frame can use data from the corresponding block from the first frame to encode the block from the second frame using inter-frame prediction. In other cases, where the predictive value of the corresponding segment of the first frame was low, for example where the segment contained objects in motion, the second frame may not use information from the first frame and instead either predict the block using neighboring blocks in the second frame (e.g., using intra prediction) or can encode the block with no prediction.

Well-predicted blocks in the second frame can be uniformly predicted from the first frame with a uniform motion vector (or no motion vector), such that no coding decisions are used at the per-block level. However, blocks being part of a non-background segment can still use the first frame as a reference—it is just one of the options along with using intra-frame prediction or using a different reference frame, depending upon which type of encoding results in few bits to include in the encoded bitstream relative to the image quality. The selection of the reference frame is just one of the coding parameters selectable at the segment-level. Since the predictive benefit will be better in the background, background-segment blocks in the first frame can be encoded at a higher quality (lower quantizer, for example), and the same blocks in the subsequent frames can be encoded with few or no coefficients. For non-background blocks, the quantizer selections can be different to lead to a more equal distribution of datarate across frames in the sequence.

In an implementation, a code can be added to specify the end-of-block position in the list of transform (e.g., DCT) coefficients on a per-segment basis. If a particular segment has great predictiveness, it can be assumed that the residual signal will be relatively small for that segment, particularly in the presence of high- or medium-frequency DCT coefficients. Therefore, for example, if the information at the segment level indicates that no non-DC (or only low-frequency) transform coefficients will be encoded, the end-of-block signal can be omitted to save bits that can be spent on other elements of the video frame.

Figure 6:
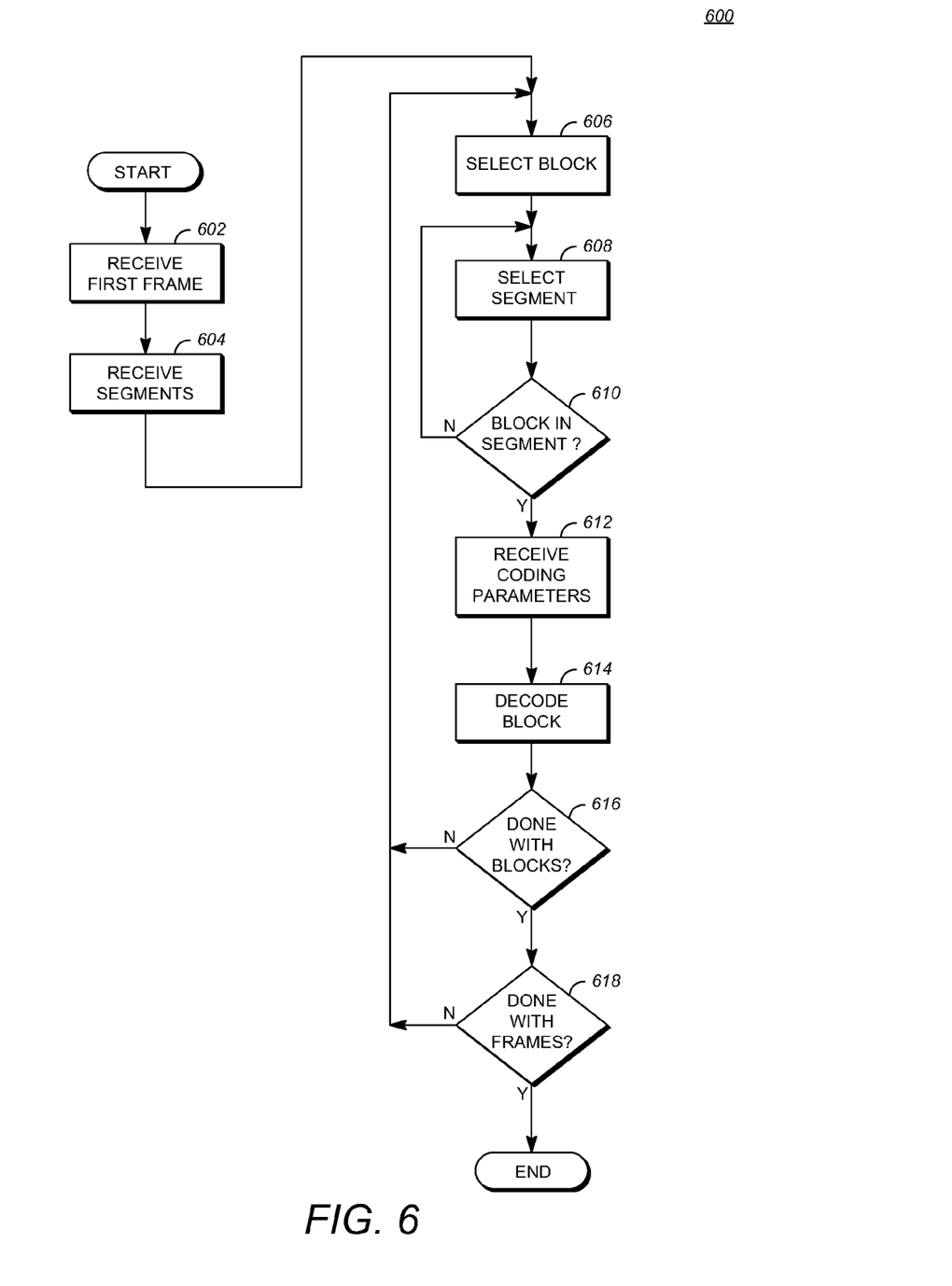
FIG. 6 is a flowchart of process for decoding a video stream according to another implementation.

FIG. 6 is a flowchart of process 600 for decoding a video stream according to another implementation. Process 600 can be implemented in a decoder such as decoder 100 to select values of decoding parameters used by decoder 100 to decode an encoded video stream. Process 600 can be implemented, for example, as a software program that is executed by computing devices such as transmitting station 12 or receiving station 30. The software program can include machine-readable instructions that are stored in a memory such as memory 16 or memory 34 that, when executed by a processor such as CPU 14 or CPU 32, cause the computing device to perform process 600. For example, method of operation can be implemented using decoder 100. Process 600 can also be implemented using specialized hardware. As explained above, some computing devices may have multiple memories and multiple processors, and the steps of process 600 may in such cases be distributed using different processors and memories.

For simplicity of explanation, process 600 is depicted and described as a series of steps. However, steps in accordance with this disclosure can occur in various orders and/or concurrently. Additionally, steps in accordance with this disclosure may occur with other steps not presented and described herein. Furthermore, not all illustrated steps may be required to implement a method in accordance with this disclosure.

At step 602, a first frame of an encoded video stream can be received. The encoded video stream can be received in any number of ways, such as by receiving the encoded video data over a network, over a cable, or by reading the encoded video stream from a primary memory or other storage device, including a disk drive or removable media such as a CF card, SD card, or the like. At step 604, the segments of the first frame can be received by extracting the segment information, which was encoded into the video stream during the encoding process, from the encoded video stream. These segments can be used to decode the first frame of the video stream and can include information such as which blocks of a frame belong to the segment and any decoding parameters associated with the segment that were encoded at the segment level.

At step 606, a block to be decoded can be selected from the frame. The blocks can be selected, for example, in raster scan order or any other order expected by a decoder such as decoder 100. At step 608, a segment of the segments received at step 606 can be selected. At step 610, the address of the selected block in the frame can be compared to the addresses of blocks included in the selected segment to determine if the selected block belongs to the segment. If the selected block does not to belong to the segment, process 600 can loop back to step 606 to select another segment of the received segments and repeat step 610. This loop can be continued until a segment is found to which the current block belongs or the segments are exhausted.

At step 612, the decoding parameters can be received by extracting the parameters from the segment information associated with the received frames of the video stream. These parameters correspond to the encoding parameters included in the video stream by process 500 in FIG. 5 and can be called more generally coding parameters. These parameters can be used to decode the received frames and blocks. At step 614, the current block is decoded using the decoding parameters received at the segment level, if applicable, and any other decoding parameters received at the block level.

At step 616, process 600 checks to see if any more blocks of the first frame remain to be processed. If more blocks remain, process 600 loops back to step 608 to get the next block. If all blocks of the current frame have been processed, process 600 checks for any additional frames in the encoded video stream in step 618. If there are no additional frames, process 600 ends.

If there are additional frames, process 600 picks the next frame (e.g., the subsequent frame in the sequence) and begins to process the first block of the frame at step 606. Blocks of the frame can be decoded using, for example, the decoded blocks of the first frame and the decoding parameters at the segment level or decoding parameters at the block level, or using, for example, decoding parameters at the block level and previously-decoded blocks of the current frame. The next frame can also receive a new segmentation in certain embodiments.

Figure 7:
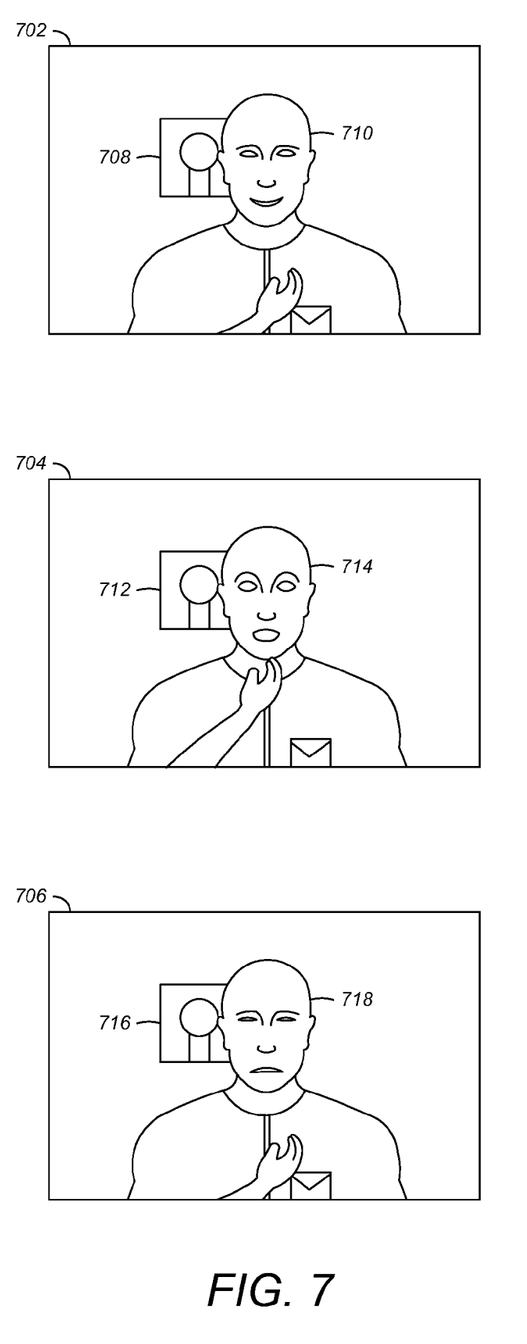
FIG. 7 is a diagram of three frames of a video stream used to illustrate the processing of FIGS. 5 and 6.

FIG. 7 is a diagram of three frames 702, 704, 706 of a video stream used to illustrate the processing of FIGS. 5 and 6. In frame 702, a portion of a background object 708 remains relatively unchanged from frame 702 to frame 704 and from frame 704 to frame 706. Thus, background object 708 can be defined as a first segment with encoding parameters appropriate for a static or background segment. Because a background object remains relatively unchanged, blocks of the segment 712, 716 in subsequent frames 704, 706 can be well-predicted by first frame 702. In contrast, a person 710 in the foreground of frame 702 exhibits movement across subsequent frames 704 and 706 as indicated by 714 and 718, respectively, due to moving facial features and hands. The blocks representing the person in these frames may not be designated as a segment because they would be less well predicted by the blocks of first frame 702. Alternatively, they could be designated as a segment with relatively few encoding parameters designated at the segment level.

In disclosed implementations, video streams can be encoded with different values of coding parameters, including motion prediction modes or quantizer (Q) for different regions or segments. A frame of a video stream in disclosed implementations can include a plurality of regions or segments. As used herein, unless described otherwise, the term "segment" and the term "region" can be used interchangeably. Using different encoding parameters for different segments of a frame of a video stream can permit the frame to be encoded with relatively fewer bits for one segment while encoding another segment using more bits while maintaining acceptable image quality for both segments due to the properties of the video stream for the segments. A video stream can be processed to distinguish between segments of a frame which contain non-moving scene elements and segments of a frame which contain moving scene elements. The additional bits saved by specifying coding parameters on a segment level can be used to code the image data, for example, thus leading to better looking content.

For example, in the case of a static or mobile background, the information in all frames of the scene will be highly similar. As a result, higher percentages of the datarate for those segments/blocks can be spent on optimizing the quality of the background information in the current frame. The percentage can be equal to the predictive benefit at the segment level. A relatively higher datarate for the static blocks in the current frame will lead to better-looking content in the blocks, which will then be visible in all future blocks that use the current frame to predict their own content (either directly or indirectly).

Since the current frame is available as a reference frame for all subsequent frames and has a high quality and predictiveness in the case of static scenes, it is more likely than not that future frames will use the current frame as their reference frame (or predictor). Therefore, an implementation of the technique herein can be used to assign probabilities to reference frame selection to individual segments by specifying that the current frame has a higher probability of being used as a reference frame than other available reference frames in the static background segment. Alternatively, the bitstream can be modified to specify that only the current frame may be used as a reference frame in the static background segment. By doing so, the amount of bits spent on reference frame coding in the static background segment can be decreased, thus leaving more available bits for coding actual information (such as the image information in the static background segment or in another segment).

In the implementations described above, the predictiveness (e.g., the predictive benefit) is used to segment the frame into different objects. Other techniques can be used to segment the frame, such as pattern recognition technology that distinguishes objects that move in relation to a background from the background or distinguish objects which exhibit multiple types of motion from objects which exhibit more consistent motion rate or directions. One pattern recognition technology can be face recognition. Motion vector analysis can also be used, for example, by taking advantage of the knowledge that if one object moves left, its blocks will have different motion vectors than those of an object moving right. Such correlation in terms of clusters/groups of blocks can be used to divide a frame into different objects by k-means clustering or other algorithms.

The aspects of encoding and decoding described above illustrate some exemplary encoding and decoding techniques. However, it is to be understood that encoding and decoding, as those terms are used in the claims, could mean compression, decompression, transformation, or any other processing or change of data.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

Implementations of transmitting station 12 and/or receiving station 30 (and the algorithms, methods, instructions, etc., stored thereon and/or executed thereby, including by encoder 70 and decoder 100) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors or any other suitable circuit. In the claims, the term "processor" should be understood as encompassing any of the foregoing hardware, either singly or in combination. The terms "signal" and "data" are used interchangeably. Further, portions of transmitting station 12 and receiving station 30 do not necessarily have to be implemented in the same manner.

Further, in one aspect, for example, transmitting station 12 or receiving station 30 can be implemented using a general purpose computer or general purpose processor with a computer program that, when executed, carries out any of the respective methods, algorithms and/or instructions described herein. In addition or alternatively, for example, a special purpose computer/processor can be utilized which can contain other hardware for carrying out any of the methods, algorithms, or instructions described herein.

Transmitting station 12 and receiving station 30 can, for example, be implemented on computers in a screencasting system. Alternatively, transmitting station 12 can be implemented on a server and receiving station 30 can be implemented on a device separate from the server, such as a handheld communications device. In this instance, transmitting station 12 can encode content using an encoder 70 into an encoded video signal and transmit the encoded video signal to the communications device. In turn, the communications device can then decode the encoded video signal using a decoder 100. Alternatively, the communications device can decode content stored locally on the communications device, for example, content that was not transmitted by transmitting station 12. Other suitable transmitting station 12 and receiving station 30 implementation schemes are available. For example, receiving station 30 can be a generally stationary personal computer rather than a portable communications device and/or a device including an encoder 70 may also include a decoder 100.

Further, all or a portion of implementations of the present invention can take the form of a computer program product accessible from, for example, a tangible computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described embodiments, implementations and aspects have been described in order to allow easy understanding of the present invention and do not limit the present invention. On the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. A method for encoding a video stream having a plurality of frames, comprising:
    receiving a first frame of the plurality of frames;
    receiving a second frame of the plurality of frames;
    determining a first error for a plurality of blocks of the second frame based on intra-frame prediction using a processor;
    determining a second error for the plurality of blocks of the second frame based on inter-frame prediction using at least one block of the first frame;
    determining a predictive benefit for one or more blocks of the first frame by comparing the first error and the second error of one or more blocks of the second frame corresponding to the one or more blocks of the first frame;
    segmenting the first frame to form a first segment based on the predictive benefit;
    selecting at least a first coding parameter for the first segment of the first frame; and
    encoding blocks of the first segment of the first frame into a bitstream using at least the first coding parameter.

2. The method of claim 1, further comprising:
    determining a first segment of the second frame corresponding to the first segment of the first frame; and
    encoding blocks of the first segment of the second frame using at least the first coding parameter and corresponding blocks of the first segment of the first frame.

3. The method of claim 1, further comprising:
    encoding the first coding parameter into the bitstream with data identifying the first segment of the first frame.

4. The method of claim 1 wherein:
    determining the first error comprises calculating a sum of transformed residual values for each block of the plurality of blocks of the second frame based on the intra-frame prediction; and determining the second error comprises calculating a sum of a transformed residual values for each block of the plurality of blocks of the second frame based on the inter-frame prediction.

5. The method of claim 1 wherein:
determining the first error comprises calculating a sum of absolute differences of residual values for each block of the plurality of blocks of the second frame based on the intra-frame prediction; and
determining the second error comprises calculating a sum of absolute differences of residual values for each block of the plurality of blocks of the second frame based on the inter-frame prediction.

6. The method of claim 1 wherein:
determining the first error comprises calculating a mean square error of residual values for each block of the plurality of blocks of the second frame based on the intra-frame prediction; and
determining the second error comprises calculating a mean square error of residual values for each block of the plurality of blocks of the second frame based on the inter-frame prediction.

7. The method of claim 1 wherein segmenting the first frame comprises one of:
segmenting the first frame based on grouping like values for the predictive benefit using k-means clustering; or
segmenting the first frame based on grouping like values for the predictive benefit using an expectation-maximization algorithm.

8. The method of claim 1 wherein determining the predictive benefit comprises:
subtracting the first error from the second error to generate the predictive benefit when the first error is greater than the second error; and wherein the blocks of the first segment have a common positive value for the predictive benefit.

9. The method of claim 8, further comprising:
setting the predictive benefit to zero when the first error is less than or equal to the second error; and wherein those blocks having the predictive benefit of zero are not identified with a segment during segmentation.

10. The method of claim 1 wherein the first coding parameter includes at least one of a single motion prediction, a dual motion prediction, a motion prediction mode, a quantizer level, a loop filter strength, a reference frame indicator, or an end-of-block position.

11. The method of claim 1 wherein the first coding parameter comprises a motion vector.

12. The method of claim 1 wherein the second frame is one of a series of frames that are temporally adjacent to the first frame wherein:
determining the first error includes determining a first error for a plurality of blocks of each of the series of frames based on intra-frame prediction;
determining the second error includes determining a second error for the plurality of blocks of each of the series of frames based on inter-frame prediction using the at least one block of the first frame; and determining the predictive benefit for one or more blocks of the first frame comprises:
subtracting the first error from the second error for each block of the plurality of blocks of each of the series of frames corresponding to a respective block of the one or more blocks of the first frame; and summing a resultant of subtracting the first error from the second error for the respective block of the one or more blocks of the first frame to generate the predictive benefit for the respective block.

13. A method for decoding an encoded video stream having a plurality of frames, comprising:
receiving a first frame of the plurality of frames;
receiving a first segment identifying a plurality of blocks of the first frame, the first segment formed by:
determining a first error for a plurality of blocks of at least a second frame based on intra-frame prediction using a processor;
determining a second error for the plurality of blocks of at least the second frame based on inter-frame prediction using at least one block of the first frame;
determining a predictive benefit for one or more blocks of the first frame by comparing the first error and the second error of one or more blocks of the at least the second frame corresponding to the one or more blocks of the first frame; and
segmenting the first frame based on the predictive benefit;
receiving at least a first coding parameter associated with the first segment;
decoding the plurality of blocks of the first segment using at least the first decoding parameter;
receiving the second frame of the plurality of frames;
determining a segment of the second frame including a plurality of blocks corresponding to the plurality of blocks of the first segment using a processor; and
decoding blocks of the segment of the second frame using the at least the first coding parameter and corresponding blocks of the first segment of the first frame.

14. The method of claim 13 wherein the first decoding parameter includes at least one of a single motion prediction, a dual motion prediction, a motion prediction mode, a motion vector a quantizer level, a loop filter strength, a reference frame indicator, or an end-of-block position.

15. The method of claim 13, further comprising:
receiving a third frame of the plurality of frames;
determining a segment of the third frame including a plurality of blocks corresponding to the plurality of blocks of the first segment; and
decoding blocks of the segment of the third frame using the at least the first coding parameter and corresponding blocks of the first segment of the first frame.

16. An apparatus for encoding a videos stream having a plurality of frames, comprising:
a memory; and
a processor configured to execute instructions stored in the memory to:
receive a first frame of the plurality of frames;
receive a second frame of the plurality of frames;
determine a first error for a plurality of blocks of the second frame based on intra-frame prediction;
determine a second error for the plurality of blocks of the second frame based on inter-frame prediction using at least one block of the first frame;
determine a predictive benefit for one or more blocks of the first frame by comparing the first error and the second error of one or more blocks of the second frame corresponding to the one or more blocks of the first frame;
segment the first frame to form a first segment based on the predictive benefit;
select at least a first coding parameter for the first segment of the first frame; and encode blocks of the first segment of the first frame into a bitstream using at least the first coding parameter.

17. The apparatus of claim 16 wherein the processor is further configured to:
determine a first segment of the second frame corresponding to the first segment of the first frame; and
encode blocks of the first segment of the second frame using at least the first coding parameter and corresponding blocks of the first segment of the first frame.

18. The apparatus of claim 17 wherein the first coding parameter is at least one of a motion prediction mode, a quantizer or a motion vector.

19. The apparatus of claim 16 wherein the processor is configured to:
determine the first error by calculating a sum of transformed residual values for each block of the plurality of blocks of the second frame based on the intra-frame prediction; and
determine the second error by calculating a sum of a transformed residual values for each block of the plurality of blocks of the second frame based on the inter-frame prediction.

20. The apparatus of claim 16 wherein the processor is configured to:
determine the first error by calculating a sum of absolute differences of residual values for each block of the plurality of blocks of the second frame based on the intra-frame prediction; and
determine the second error by calculating a sum of absolute differences of residual values for each block of the plurality of blocks of the second frame based on the inter-frame prediction.

* * * * *